United States Patent [19]

Josephson

[11] 4,193,605

[45] Mar. 18, 1980

[54] SEAL FOR DAMPER BLADES

[75] Inventor: Louis Josephson, Yonkers, N.Y.

[73] Assignee: American Hardware & Paint Co., Inc., Elizabeth, N.J.

[21] Appl. No.: 903,153

[22] Filed: May 5, 1978

[51] Int. Cl.² .............................................. F16J 15/32
[52] U.S. Cl. .................................. 277/184; 277/211;
296/93; 98/119
[58] Field of Search ................... 277/184, 205, 206 R, 277/209–211; 296/93; 98/119

[56] References Cited

U.S. PATENT DOCUMENTS

| | | | |
|---|---|---|---|
| 2,067,144 | 1/1937 | Madden | 98/119 X |
| 2,074,024 | 3/1937 | Phail | 98/119 |
| 2,314,003 | 3/1943 | Mader | 98/119 |
| 2,355,412 | 8/1944 | Bird | 98/119 |
| 2,594,944 | 4/1952 | Lohman | 98/119 |
| 2,766,494 | 10/1956 | Stremmel | 296/93 X |
| 3,177,534 | 4/1965 | Millhouse et al. | 296/93 X |
| 4,119,325 | 10/1978 | Oakley et al. | 296/93 X |
| 4,123,100 | 10/1978 | Ellis | 296/93 |

FOREIGN PATENT DOCUMENTS

| | | | |
|---|---|---|---|
| 545199 | 2/1956 | Belgium | 296/93 |
| 557545 | 5/1958 | Canada | 98/119 |
| 1215009 | 4/1966 | Fed. Rep. of Germany | 277/184 |
| 2209190 | 8/1973 | Fed. Rep. of Germany | 296/93 |
| 1009088 | 11/1965 | United Kingdom | 277/211 |

*Primary Examiner*—Robert S. Ward, Jr.
*Attorney, Agent, or Firm*—Dressler, Goldsmith, Clement, Gordon & Shore, Ltd.

[57] ABSTRACT

Seals for the edge of a pivoted blade are provided in which an elongated strip of rigid material of U-shaped cross-section having side walls the interior of at least one of which carries resilient teeth pointed toward the closed portion of the U, and the open end of the U is narrowed to enhance the grip of the seal on the edge of a blade. The preferred sealing expedient employs a flap which extends to one side of the strip and which is dimensioned so that it does not reach the free end of the adjacent side wall. In one form of the seal, the side wall opposite the flap is extended to lock with a bend on the edge of the blade. In a damper, the seal is mounted on the edge remote from the air flow into the damper so that the flap is biased against the adjoining blade and the air pressure serves to strengthen the seal.

6 Claims, 3 Drawing Figures

SEAL FOR DAMPER BLADES

This invention is concerned with controlling the amount of air which is circulated within a building. When control is inadequate, then an excessive amount of air must be heated, cooled, moved, filtered, humidified or dehumidified, and this unnecessarily consumes energy. The quantity of unneeded energy now consumed unnecessarily is up to about 30% of the energy now expended for a building's direct energy costs. This does not include down time, repair costs or replacement of parts.

In a typical air circulating system, we have two main sets of dampers, one to control inlet air, and a second to control spill air (to relieve excess pressure). The inlet air damper is normally opened during the spring and fall, but it must be closed during portions of the summer and winter, and also during periods when the system is not being operated. If there is any leakage, when the system is used for heating more cold air must be heated than is required. Stated differently, the temperature within the building is reduced, and the more energy is needed to heat it. Conversely, when the system is used for cooling, more hot air enters the building than is required, and more energy must be expended to cool it. Once the air is treated, then a large amount of it must be recirculated and the outlet damper must be closed occasionally. If it does not close properly, the treated air escapes. Similarly, a damper can be used within a system to enable a portion of the building to be removed from service. If this damper leaks, the loss of energy is self-evident.

Regardless of whether the damper is manually or automatically controlled, it is rarely inspected or maintained, and the result is a need for a damper which will seal fully and maintain its capacity to seal without maintenance for a prolonged period of time. This is one prime objective of this invention.

It should be observed that damper blades are normally made of bent metal sheets and these are not precision structures. Also, blades vary depending upon who manufactured them. There is thus no capacity to insure that the blades in the closed position will seat perfectly against one another. The normal practice has been to use gasketing material with adhesives to enable a good seal to be obtained. Adhesives deteriorate and gaskets lose their plasticizer. Like a growing crack, once the gasket falls loose, the moving air rips it off which leaves a gap between the blades for air to leak through. Indeed, if one gasket tears away, it would be better if none of the blades had been gasketed. This is because loose gaskets double over on themselves, and prevent all the other gasketed blades from closing.

This invention is particularly directed to minimizing leakage between the overlapped ends of the blades in a multiblade damper. This includes newly constructed dampers as well as the retrofitting of existing dampers to reduce the leakage which is presently experienced or which may be expected.

Retrofitting of existing dampers represents a particularly difficult task because whatever is done to the blade in order to provide the desired sealing capacity must be done with the blade in its operative position in the damper. In normal practice at the present time, the blades of an existing damper are removed, cleaned, sanded, modified appropriately, and then reinstalled. Also, adhesives must be applied and this introduces all sorts of difficulties including noxious vapors and the hazard of fire.

The present invention includes numerous features, and it is here desired to stress the capacity of the invention to provide an elongated sealing strip which can be forced onto the edge of a pivoted blade without the necessity of employing any added adhesive. Moreover, the combination of the sealing strip and the blade edge avoids lateral movement of the strip which prevents the strip from moving against a side wall of the damper where it can cause binding of the blades. Still another feature of the invention is the provision of a sealing expedient which is strengthened by the tendency of the air to move through the damper.

The invention will be more fully understood from a consideration of the accompanying drawings in which.

Figure 1:
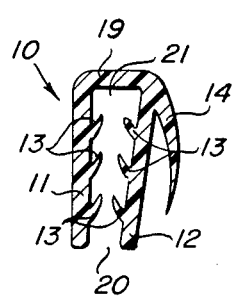
FIG. 1 is a cross-section of an illustrative sealing strip in accordance with the invention.

Referring more particularly to FIG. 1, the numeral 10 identifies a sealing strip adapted to be forced upon the edge of a pivoted blade, the strip being provided in extrusions of considerable length, and having a U-shaped cross-section. Referring more particularly to the strip 10, it is formed of rigid plastic material and comprises rigid side walls 11 and 12 and a rigid cross-member 19 which closes the bottom of the U. The interior of side walls 11 and 12 is formed with longitudinally extending teeth 13. These teeth are extruded with the U-shaped strip and are integral with the side walls, but while the side walls are rigid, the teeth are resilient. This means that the material constituting the teeth 13 will be plasticized so as to be soft while the material constituting the body of the strip 10 will contain very little plasticizer so as to be relatively rigid. Polyvinyl chloride and chlorinated polyvinyl chloride are particularly useful to constitute the plastic material.

In order that the teeth will serve their intended gripping function, these teeth must be pointed toward the closed portion of the U. As will be seen in FIG. 1, a plurality of teeth are desirably mounted on each of the side walls, one above the other.

The strip 10 carries a resilient sealing member 14 on the exterior of the strip, this sealing member extending along the length of the strip. While it is broadly possible to use gasket material or any piece of soft material, coated with presure sensitive material or not, to constitute the resilient sealing member, it is a feature in this invention to employ a flexible flap which extends away from the strip. This flap 14 is secured to the strip in the vicinity of the closed end of the U, and it preferably extends to one side of the strip where it can engage the overlapping edge of an adjoining blade in a multiblade structure.

The utilization of a flap has many advantages over the use of gasket material. Gaskets wear out from abrasion and constant pressure. A flexible flap, especially when it is constituted of plastics, such as polyvinyl chloride, which possess a memory, will retain their capacity to rebound to their initial shape for long periods of time.

Figure 2:
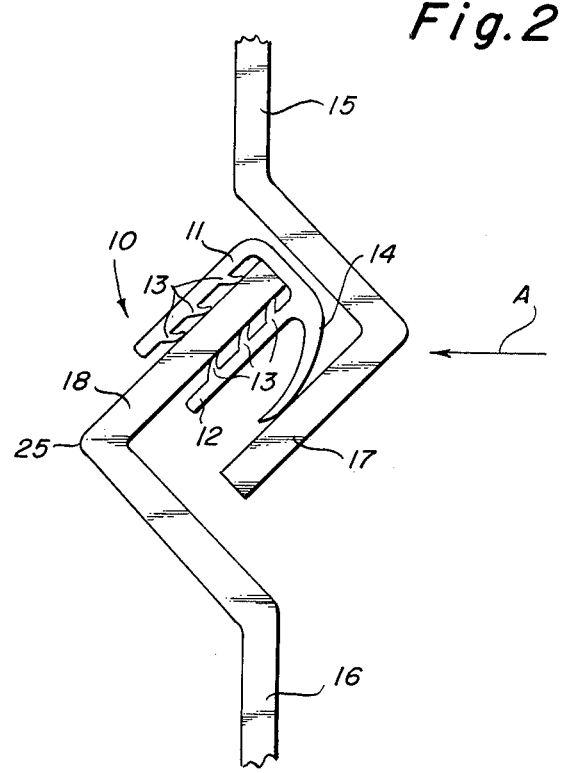
FIG. 2 is a partial side elevation showing a pair of pivoted blades with their edges overlapping with the sealing strip of FIG. 1 inserted on the edge of the blade which is remote from the air flowing into the damper.

Turning to FIG. 2, it will be seen that we have adjacent blades 15 and 16, these blades having their edges bent in appropriate fashion to provide the customary overlap as indicated at 17 and 18. In conventional structures, the blade edges are frequently bent or curved, generally described as shaped. However, and in other structures, the overlapping edges are not bent, this being the usual form of the glass blades in jalousies.

FIG. 2 shows the blade edge 18 inserted into the U-shaped strip 10, and it will be seen that the teeth 13 lock against the edge of the blade so that, and in the absence of any adhesive, it is very difficult to remove the elongated strip after it has been inserted. Indeed, finger pressure is normally insufficient.

Returning to FIG. 1, it will be seen that the space between the side walls 11 and 12 at the open end 20 of the U is narrower than the space between the side walls 11 and 12 at the closed end 21 of the U. This angling of the side walls is eliminated when the strip 10 is inserted on the edge 18, but the result is that the open end of the U bears more strongly against the edge 18 and this serves to enhance the grip. The action is not unlike the action of a clothes pin. In FIG. 2 it will be particularly observed that the teeth 13 extend longitudinally along the length of the strip 10 so that air cannot pass around the edge 18 through the interior of the U.

The intended air flow is shown by arrow A in FIG. 2 and it will be particularly observed that the strip 10 has been fitted onto only one of the overlapping edges 17 and 18 and this edge is the one remote from the incoming air. It will further be observed that the flap 14 engages with the edge 17 in such fashion that the air moving toward the damper will bias the flap 14 toward the adjoining blade edge 17 to strengthen the seal between the blades 15 and 16.

Figure 3:
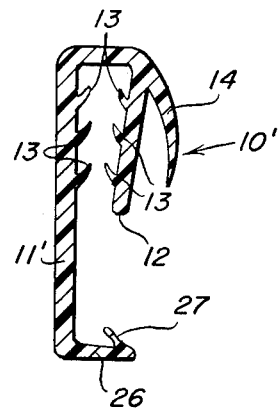
FIG. 3 is a view similar to FIG. 1, but showing a modified form of the sealing strip in which the side wall of the strip remote from the sealing flap is extended and shaped to provide a locking action as will be described.

FIG. 3 shows a variation in the construction in which the side wall 11 is extended so as to be longer than the side wall 12, the extended side wall being identified by the numeral 11' and the modified strip being identified by the numeral 10'. Returning to FIG. 2, it will be seen that the blade edge is bent as indicated at 25 and the side wall 11' is dimensioned to reach beyond a bend in the edge of a blade upon which it is fitted. In this instance, the side wall 11' is dimensioned and shaped to engage with the bend 25. However, it will be appreciated that there is considerable variation in shape and dimension of the blades which are in use, and it is only necessary that the side wall 11' be shaped and dimensioned to fit the blade. In this instance, there is a leg 26 which engages the bend 25. Also, and in preferred practice, the relatively rigid side wall 11' carries a longitudinally extending resilient tooth 27 to help to lock the side wall 11' in place.

The invention is defined in the claims which follow.

I claim:

1. A damper having a plurality of pivoted blades adapted to have their edge portions overlap when the damper is in its closed position, one of said edge portions at each overlapping position being inserted into the open end of an elongated U-shaped strip formed of rigid material of U-shaped cross-section, said U-shaped strip providing side walls the interior of at least one of which carries resilient teeth pointed toward the closed portion of the U, said strip having a resilient sealing member in the form of a flexible flap extending away from said strip and terminating at one side of said strip, said strip being carried by the blade edge remote from the intended air flow through the damper and said flap engaging the edge portion of the adjoining blade at the overlap position so that air tending to move through said damper will bias said flap toward said adjoining blade to strengthen the seal.

2. A damper as recited in claim 1 in which a plurality of teeth are mounted on each of said side walls, one above the other.

3. A damper as recited in claim 1 in which said flap is secured to said strip at the closed end of said U.

4. A damper as recited in claim 3 in which said flap is joined to said strip at the exterior of a side wall adjacent the closed end of the U.

5. A damper as recited in claim 4 in which said flap is dimensioned so that the free end thereof does not reach the free end of the adjacent side wall of said strip.

6. A damper having a plurality of pivoted blades adapted to have their edge portions overlap when the damper is in its closed position, one of said edge portions at each overlapping position being inserted into the open end of an elongated U-shaped strip formed of rigid material of U-shaped cross-section, said U-shaped strip providing side walls the interior of at least one of which carries resilient teeth pointed toward the closed portion of the U, said strip having a resilient sealing member in the form of a flexible flap extending away from said strip, said strip being positioned so that said flap engages the edge portion of the adjoining blade when the damper is closed so that air tending to move through said damper will bias said flap toward said adjoining blade to force the side of the flap against the adjoining blade and thereby strengthen the seal.

* * * * *